Patented May 15, 1934

1,958,928

UNITED STATES PATENT OFFICE 1,958,928

AGE RESISTING VULCANIZED RUBBER COMPOUND

Winfield Scott, Nitro, W. Va., assignor to The Rubber Service Laboratories Co., Akron, Ohio, a corporation of Ohio No Drawing. Application May 12, 1928, Serial No. 277,392

6 Claims. (Cl. 18—50)

The present invention relates to the manufacture of a vulcanized rubber product by an improved process wherein there is employed, in addition to the ordinary compounding ingredients, a new type of reaction product capable of imparting age resisting or anti-oxidant characteristics to the rubber product.

It is well known in the art to which this invention pertains that the use of certain organic compounds as accelerators of the rubber vulcanization process is practically precluded because of the fact that the presence of such compounds, or of their heat of decomposition or sulfur or other reaction products produced in the rubber curing process, apparently cause or aid in causing a relatively rapid deterioration of the vulcanized products. Such rubber products are said to age badly, that is the rubber becomes hard and loses a large part of its resiliency, while other characteristics such as tensile strength and the like are very detrimentally affected. It has now been found that the deterioration of the rubber compound may be substantially decreased and the effective life of the product materially lengthened if there be added to the rubber compound, such compounds as acetone anile, diacetone anile, methyl ethyl ketone anile and like compounds formed by reacting ketones on primary aromatic amines. This reaction, it is thought, takes place in the following manner:

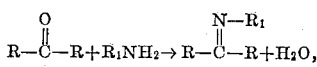

where R represents an aliphatic radical and $R_1$ represents a single benzene ring aromatic radical. The preferred proportion of the anti-oxidant used is approximately from 2 to 5% of the weight of the rubber to be vulcanized. However, if desirable, a greater or smaller proportion of anti-oxidant may be employed.

The age resisting characteristics of a vulcanized rubber product can be readily ascertained by means of an accelerated aging test wherein samples of the vulcanized product are subjected in a bomb to the action of oxygen under pressure and maintained for several hours at an elevated temperature. The treated samples are then examined and tested and the results compared with similar results obtained by testing the unaged vulcanized stock. The deterioration in properties suffered as a result of the oxidation treatment is indicative of the result that would normally be expected from that particular stock during service. Such a test is known as the Bierer-Davis aging test and produces an effect on a vulcanized rubber stock comparable with that resulting from several years of natural aging of the rubber.

One example of my preferred type of compounds, for example, acetone anile, was prepared by refluxing substantially equi-molecular proportions of acetone and aniline for approximately 40 hours in the presence of a small quantity of a catalyst, for example iodine. The reaction product was then distilled under reduced pressure and the acetone anile collected between 130 and 135° C.

Diacetone anile was prepared from diacetone alcohol and aniline similarly to the above mentioned process, excepting that anhydrous zinc chloride was added to the diacetone alcohol, aniline, and iodine mixture and the refluxing continued for an additional period of approximately fifteen hours.

Other members of the preferred type of compounds have been prepared substantially according to the first method hereinbefore mentioned.

An example of one mode of operating the invention is illustrated by the following composition, wherein acetone anile is employed as an anti-oxidant.

In this and in the other examples cited, diphenyl guanidine is used as an accelerator because it is known to produce a vulcanized rubber stock that has notoriously bad aging qualities. Other accelerators could, of course, be used and would produce stock of higher tensile strength.

A rubber stock was manufactured in the well known manner comprising

| | Parts |
|---|---|
| Pale crepe rubber | 80 |
| Zinc oxide | 4 |
| Sulfur | 1.8 |
| Diphenyl-guanidine | 0.8 |
| Acetone anile | 2.4 |

The stock was then vulcanized by heating sheets of the stock in the usual manner for forty and sixty minutes in a press maintained at the temperature given by forty pounds of steam pressure to the square inch (that is 287° F.). Portions of the stock cured as set forth were then artificially aged by heating samples of the stock in an oxygen bomb for eighteen hours at a temperature of 90° C. and under a pressure of 500 pounds of oxygen per square inch. After aging, the stock still retained the appearance and feel of a vulcanized rubber of high quality. The results obtained upon testing the aged and the unaged stocks are as follows:

| Time of cure | Hours aged | Modulus of elasticity in lbs/in$^2$ at elongations of— | | | Tensile at break in lbs/in$^2$ | Ultimate elongation |
| --- | --- | --- | --- | --- | --- | --- |
| | | 300% | 500% | 700% | | |
| | | | | | | Percent |
| 40 min. at 287° F | 0 | 157 | 362 | 1055 | 2830 | 875 |
| Do | 18 | 131 | 356 | 1048 | 1545 | 795 |
| 60 min. at 287° F | 0 | 181 | 420 | 1455 | 2910 | 830 |
| Do | 18 | 171 | 436 | 1508 | 1813 | 755 |

It is seen from the above table that the aged rubber retained to a large extent its characteristics before the aging treatment. A rubber stock containing the ingredients specified in the foregoing example with the exception that no anti-oxidant was employed, is known to completely disintegrate when subjected to the artificial aging test as described.

A further example illustrative of the anti-oxidant effect of the preferred type of compounds is the following, wherein there was prepared a mix comprising

| | Parts |
| --- | --- |
| Pale crepe rubber | 80 |
| Zinc oxide | 4 |
| Sulfur | 1.8 |
| Diphenyl-guanidine | 0.8 |
| Diacetone anile | 2.4 |

The above stock was vulcanized by heating at 287° F. for different periods of time in a press and the vulcanized stock was then aged in the manner hereinbefore described.

The results obtained by testing the aged and unaged stocks follow:

| Time of cure | Hours aged | Modulus of elasticity in lbs/in$^2$ at elongations of— | | | Tensile at break in lbs/in$^2$ | Ultimate elongation |
| --- | --- | --- | --- | --- | --- | --- |
| | | 300% | 500% | 700% | | |
| | | | | | | Percent |
| 40 min. at 287° F | 0 | 137 | 308 | 948 | 2090 | 835 |
| Do | 18 | 113 | 267 | 771 | 1138 | 775 |
| 60 min. at 287° F | 0 | 173 | 403 | 1535 | 2750 | 815 |
| Do | 18 | 141 | 379 | 1273 | 1615 | 755 |

A comparison showed rubber stock in which was incorporated prior to vulcanization one of many preferred type of anti-oxidants, for example diacetone anile, aged better than a similar rubber stock having incorporated therein prior to vulcanization one of the commercial anti-oxidants.

Other types of my preferred class of compounds, for example methyl ethyl ketone anile, have been incorporated in the rubber mix prior to vulcanization and on artificially aging the vulcanized rubber product, have been found to greatly lessen its deterioration.

The various examples hereinbefore set forth in detail are to be understood as illustrative only and not at all limitative of the scope of the invention. Other compounding ingredients and other proportions of ingredients than those indicated in the various examples may be employed in the manufacture of various types of vulcanized rubber products as is well known to those skilled in the art to which the invention pertains. The invention is to be understood as limited solely by the claims attached hereto as a part of this specification, wherein the invention is claimed as broadly as possible in view of the prior art.

What is claimed is:

1. The process of manufacturing a vulcanized rubber product possessing age resistant characteristics, which comprises incorporating with said product prior to vulcanization one member of a group consisting of diacetone anile and methyl ethyl ketone anile.

2. An age resisting rubber product comprising the vulcanization product of a rubber stock containing prior to the vulcanization thereof one member from a group consisting of diacetone anile and methyl ethyl ketone anile.

3. The process of manufacturing a vulcanized rubber product possessing age resisting characteristics, which comprises incorporating with said product prior to vulcanization diacetone anile prepared by reacting diacetone alcohol and aniline in the presence of a catalyst and distilling the diacetone anile so formed, and completing the vulcanization.

4. The process of manufacturing a vulcanized rubber product possessing age resisting characteristics, which comprises incorporating diacetone anile into said product prior to vulcanization and completing the vulcanization.

5. An age resisting rubber product comprising the vulcanization product of a rubber stock containing prior to the vulcaniaztion of said stock diacetone anile prepared by reacting diacetone alcohol and aniline in the presence of a catalyst and distilling the diacetone anile so formed.

6. An age resisting rubber product comprising the vulcanization product of a rubber stock containing diacetone anile prior to the vulcanization thereof.

WINFIELD SCOTT.